Patented Dec. 26, 1922.

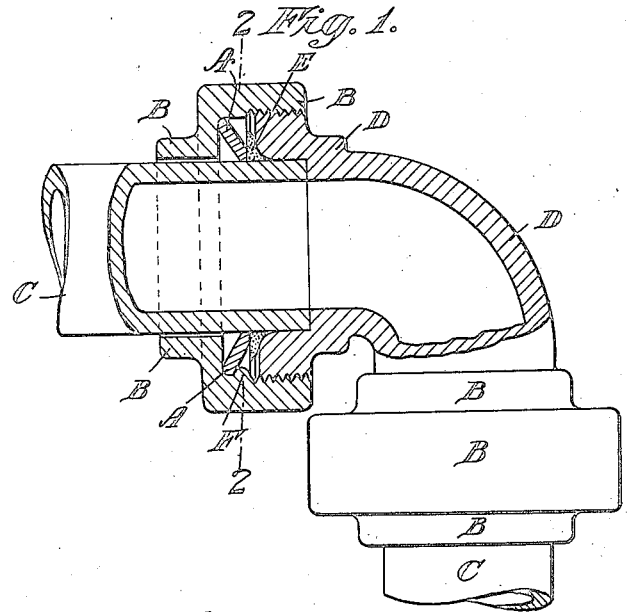
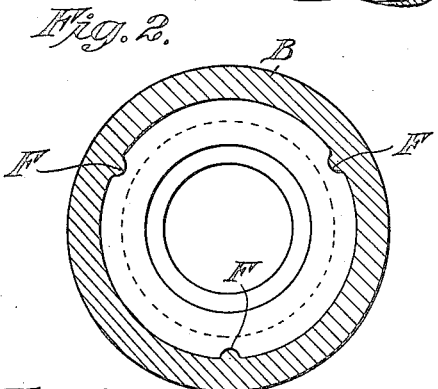
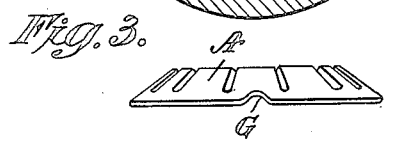
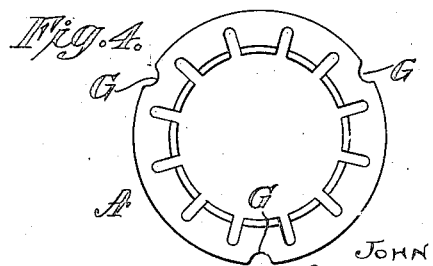

1,440,207

UNITED STATES PATENT OFFICE.

JOHN A. BURNS, OF POINTHOUSE, BISHOPTON, SCOTLAND.

DEVICE FOR HOLDING CYLINDRICAL BODIES, SUCH AS PIPES, RODS, AND THE LIKE AGAINST ENDWISE MOVEMENT.

Application filed March 26, 1920. Serial No. 369,060.

*To all whom it may concern:*

Be it known that I, JOHN ALEXANDER BURNS, a subject of the King of Great Britain and Ireland, and a resident of Pointhouse, Bishopton, in the county of Renfrew, Scotland, have invented a certain new and useful Device for Holding Cylindrical Bodies Such as Pipes, Rods, and the like Against Endwise Movements, of which the following is the specification.

The invention has for its object to provide a device for holding cylindrical bodies such as rods, tubes, or the like in such a manner as to resist a force tending to produce tension or compression in them and applicable, for example, in pipe joints.

The device comprises essentially a plurality of struts symmetrically inclined to a plane normal to the axis of the rod, tube or the like, abutting the rod, tube, or the like at their inner ends, and at their outer ends engaged by a collar or the like adapted to take thrust. The struts are joined at their outer ends, thus forming as a whole a hollow truncated cone, radially slotted from the direction of its apex towards its base. Or instead of being completely conical the base may be a flat annulus or the whole may be conoidal. The inner periphery of the strut device is of slightly lesser diameter than the rod, tube or the like to which it is to be applied, and the outer periphery is adapted to be engaged by a collar or like adjusting member loosely fitting the rod, tube or the like. Means are provided for forcing the collar endwise against the strut device and so forcing that device into engagement with the rod, tube or the like.

An example of the device applied in a pipe-coupling is shown in an accompanying sheet of explanatory drawings in which Figure 1 is a side elevation partly sectional of two complete couplings, Figure 2 a sectional end elevation on the line 2—2 of a part of Figure 1, and Figures 3 and 4 respectively an elevation and a plan of the strut device.

In this example the strut device shown separately in Figures 3 and 4 is in the form of a hollow truncated cone radially slotted from its apex towards its base, so as to form around its apex a series of struts A. It is received in a recess in a collar B which fits loosely upon the pipe C and is screw-threaded to engage a union piece D of usual form receiving the end of the pipe against which the pipe end is forced by the action of screwing up the collar B. This action also causes the strut device A to compress a packing ring E interposed between the apex of the device and the union piece.

Projections F are formed within the recess in the collar B to retain the strut device in position in the recess. Counterpart notches G are formed around the periphery of the device to enable it to be passed beyond these projections, after which it is turned through a small angle and thus retained.

In operation, the collar B is first placed in position and the strut device is then pushed into place upon the pipe which is then butted firmly against the union piece D. The screw of the collar is then engaged with the union piece and the joint tightened by screwing up the collar.

It is clear that the application of such a strut device may be widely varied for the holding of many objects other than pipes against endwise movement.

What I claim is:—

1. A union device for plain ended rods, pipes and the like, said device comprising a union collar with internal thrust seat, in combination with a strut device of generally frusto-conical shape adapted to bear against said seat, together with means to detain said thrust device within said collar.

2. A union device for plain ended rods, pipes and the like, said device comprising a union collar with internal thrust seat, and inwardly projecting lugs spaced from said seat, in combination with a strut device of generally frusto-conical shape adapted to bear against said seat and having peripheral notches to permit said thrust device to freely pass said inwardly projecting lugs on the sleeve and to be retained thereby on the rotation of the thrust device with relation to said collar.

In testimony whereof I have signed my name to this specification.

J. A. BURNS.